UNITED STATES PATENT OFFICE.

ADOLF RÖMER, OF STUTTGART, GERMANY, ASSIGNOR TO THE FIRM OF DEUTSCH-KOLONIALE GERB- & FARBSTOFF-GESELLSCHAFT M. B. H., OF KARLSRUHE, GERMANY.

TANNING SUBSTANCES AND METHOD OF PREPARING THE SAME.

1,186,500. Specification of Letters Patent. Patented June 6, 1916.

No Drawing. Application filed January 24, 1916. Serial No. 74,013.

*To all whom it may concern:*

Be it known that I, ADOLF RÖMER, a subject of the German Emperor, and resident of Stuttgart, Germany, have invented certain new and useful Improvements in Tanning Substances and Methods of Preparing the Same, of which the following is a specification.

My invention relates to new tanning substances and to a method of preparing such substances by condensing formaldehyde with aromatic compounds.

I have ascertained that condensation products soluble in water and capable of precipitating glue, which present an extraordinary tanning capacity, can be produced by acting with formaldehyde or with some other active methylene-contained substance giving off formaldehyde in a watery solution and at the ordinary temperature upon an oxynaphthalene compound such as an amino- or hydroxy-naphthol or an amino- or hydroxy-naphthol-mono- or disulfonic acid or an amino-oxy-naphthol-mono- or disulfonic acid. The amino and hydroxy groups are substantial equivalents since when either or both are present as substituents in the naphthol nucleus, the resulting condensation products show similar glue precipitating and tanning properties. By the expression amino or oxynaphthol compound I include aminonaphthol and oxy- and poly-oxynaphthols and also the corresponding sulfonic acids. Instead of single aromatic compounds also mixtures of such compounds may be subjected to the said process of condensation. It is possible to carry the reaction out in a weak acid solution but in such a case the acid present should be so little that it does not take part in the reaction. The presence of concentrated sulfuric acid should be avoided in the process, as such acid would possibly cause sulfur to enter into the molecule. It is equally impossible to carry the reaction through in alkaline solutions.

In many cases I have found it preferable to replace the aromatic compounds mentioned above by salt-like combinations of such compounds and more especially by their alkali metal salts, a corresponding (*i. e.* molecularly equivalent) quantity of acid being added. In these cases the acid such as for instance acetic acid may be added either simultaneously with the formaldehyde or at a later stage. In some cases I prefer adding the acid gradually in order to prevent unaltered free acid from being precipitated. A typical example of the advantage gained by employing the alkali metal salt presents itself in the case of the 2-amino-8-oxy-naphthalene-6-sulfonic-acid. If the free acid is employed the present process will not work well. However, if a salt such as the sodium salt is employed, the reaction will be carried through in a quantitative way at an ordinary temperature and in watery solution. In practising my invention a simple test will show whether it is preferable to employ a salt instead of the free acid.

The process forming the object of this invention may be varied for instance by reacting with formaldehyde upon solutions of the salts and then slowly adding acid or by gradually adding a mixture of formaldehyde and acid to the salt solutions.

As a rule two molecules of the aromatic compound are subjected to condensation with one molecule of formaldehyde, but in some cases a relation of 1:1 may be used. In order to obtain these products of condensation the total formaldehyde required may be added at the beginning, or else the first condensation product (2:1) may be produced and then transformed into the second condensation product (1:1) by adding the required quantity of formaldehyde; in this latter case the first product is not isolated as such but the final condensation is caused to take place in the same process. In contradistinction to other processes where a great excess of formaldehyde is used, such an excess should be carefully avoided in the present process.

Example I: 4.8 parts by weight of 2-amino-8-oxynapthalene-6-sulfonic-acid are dissolved in 50 parts of water and 1.06 parts of sodium carbonate free of water. To the solution of this salt a mixture of 12 parts of acetic acid (of 10%) and 0.75 parts of formaldehyde (of 40%) are added while continually stirring. After a short time quantitative condensation has taken place and the product of condensation can be obtained by precipitating with concentrated hydrochloric acid or with sodium chlorid.

Example II: 5 parts by weight of 2.3- dioxynaphthalene-6-sulfonic-acid are dissolved in 300 parts of water and 0.78 parts of formaldehyde (of 40%) are gradually added. Stirring is continued for some hours and the product of condensation is then precipitated with sodium chlorid.

Further investigations have shown that it is not necessary in all cases to work at a low temperature. It is equally feasible to carry the reaction through at a higher temperature, for instance in a water bath. In some cases heating will even bring about a quicker and more perfect condensation, for instance in the case of 2 : 3-dioxynaphthalene-6-sulfonic-acid. The most favorable temperature can easily be ascertained in each case by a test.

Example III: 5 parts by weight of potassium 2:3 dioxynaphthalene-6-sulfonic-acid are dissolved in 300 parts of water. The solution is heated to about 80 degrees C. on a water bath and 0.68 parts of formaldehyde (of 40%) are gradually added. Thereafter the quantity of acetic acid, which corresponds to the quantity of potassium salt, is added, stirring is continued for a short time and the product of condensation is then precipitated with sodium chlorid. Heating will cause the process to be carried through quicker and will cause the output of condensation product to be greater.

The products of condensation to be obtained according to the present process have a strong capacity for precipitating glue. They can be employed either alone or in combination with other tanning substances such as vegetable substances for tanning hides. The products of condensation are greatly distinguished from the raw materials. While dioxynaphthalene- and amino-oxynaphthalene-sulfonic-acid if mixed with concentrated sulfuric acid will not undergo any change, the condensation products being treated equally will show characteristic changes of color.

I claim:—

1. A process of making tanning substances which comprises effecting a reaction between an active methylene-containing substance and an oxynaphthalene compound while avoiding the presence of concentrated sulfuric acid and stopping the reaction when the resulting condensation product is soluble in water and capable of precipitating glue.

2. A process of making tanning substances which comprises effecting a reaction between an active methylene-containing substance and an oxynaphthalene compound in a weak acid solution.

3. A process of making tanning substances which comprises effecting a reaction between formaldehyde and an oxynaphthalene compound while avoiding the presence of concentrated sulfuric acid and stopping the reaction when the resulting condensation product is soluble in water and capable of precipitating glue.

4. A process of making tanning substances which comprises effecting a reaction between formaldehyde and an oxynaphthalene compound in the proportions of at least one molecule of formaldehyde to two molecules of the oxynaphthalene compound while avoiding the presence of concentrated sulfuric acid and stopping the reaction when the resulting condensation product is soluble in water and capable of precipitating glue.

5. A process of making tanning substances which comprises condensing formaldehyde with an amino- or oxynaphthol compound while avoiding the presence of concentrated sulfuric acid.

6. A process of making tanning substances which comprises condensing formaldehyde with an amino- or oxynaphthol-sulfonic acid while avoiding the presence of concentrated sulfuric acid.

7. A process of making tanning substances which comprises condensing formaldehyde with an amino-oxynaphthol-sulfonic acid.

8. A process of making tanning substances which comprises condensing formaldehyde with a salt of an amino- or oxynaphthol compound, a molecularly equivalent quantity of acid being added during the condensation.

9. A process of making tanning substances which comprises condensing formaldehyde with a salt of an amino- or oxynaphthol sulfonic acid, a molecularly equivalent quantity of acid being added.

10. A process of making tanning substances which comprises condensing formaldehyde with a salt of an amino-oxynaphthol sulfonic acid, a molecularly equivalent quantity of acid being added.

In testimony whereof I have signed my name to this specification in the presence of two subscribing witnesses.

ADOLF RÖMER.